(12) United States Patent
Hudgins, Jr. et al.

(10) Patent No.: US 7,855,871 B2
(45) Date of Patent: Dec. 21, 2010

(54) GENERATOR READY LOAD CENTER

(75) Inventors: Jeffrey K. Hudgins, Jr., Gainesville, GA (US); Brian Rusch, Suwanee, GA (US); Kris Robinson, Atlanta, GA (US); Jon Pickens, Roswell, GA (US); Carey Harnois, Grayson, GA (US); James Washburn, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/408,258

(22) Filed: Mar. 20, 2009

(65) Prior Publication Data
US 2009/0244816 A1    Oct. 1, 2009

Related U.S. Application Data

(60) Provisional application No. 61/039,498, filed on Mar. 26, 2008.

(51) Int. Cl.
*H01H 9/26* (2006.01)

(52) U.S. Cl. .................. 361/624; 361/622; 361/631; 361/656; 361/664; 700/286; 200/50.32; 200/50.33; 307/64; 307/126

(58) Field of Classification Search ............. 361/622, 361/624, 631, 634, 641, 656, 664, 620; 200/50.32, 200/50.33, 50.37, 50.39, 50.4, 268; 307/80, 307/64, 115, 23, 126, 125, 130, 139, 141; 700/286, 295
See application file for complete search history.

(56) References Cited

U.S. PATENT DOCUMENTS

| | | | |
|---|---|---|---|
| 3,647,997 A * | 3/1972 | Nerem | 200/50.33 |
| 3,778,633 A * | 12/1973 | DeVisser et al. | 307/64 |
| 4,079,439 A | 3/1978 | Bednar | |
| 4,423,336 A * | 12/1983 | Iverson et al. | 307/64 |
| 4,744,003 A * | 5/1988 | Koslosky et al. | 361/656 |
| 5,532,525 A * | 7/1996 | Kaiser et al. | 307/64 |
| 5,761,027 A * | 6/1998 | Flegel | 361/664 |

(Continued)

FOREIGN PATENT DOCUMENTS

WO    WO 0048302 A1    8/2000

OTHER PUBLICATIONS

Siemens News and Press (online), Feb. 28, 2008. Retrieved from the internet URL: http://www.sea.siemens.com/us/news/consturction/pages/siemens-new-residential-generator-ready-load-center-is-now-available.aspx> retrieved on Jan. 22, 2010, the whole document; Others.

*Primary Examiner*—Michael V Datsko
(74) *Attorney, Agent, or Firm*—Jose R. de la Rosa

(57) ABSTRACT

The present invention relates generally to a load center. More particularly, the invention encompasses a generator ready load center (GRLC). The present invention is also directed to a novel generator ready load center (GRLC) that operates as a standard load center but is ready to accommodate an automatic transfer switch (ATS) for a standby generator, or a manual transfer switch (MTS) for a portable generator. Further the generator ready load center provides an automatic and manual transfer between primary and secondary power sources. The generator ready load center solves the problem of dangerous back-feeding between the primary power source and the secondary power source.

12 Claims, 7 Drawing Sheets

U.S. PATENT DOCUMENTS

| | | | |
|---|---|---|---|
| 5,977,492 A * | 11/1999 | Taylor et al. | 200/50.32 |
| 6,172,432 B1 * | 1/2001 | Schnackenberg et al. | 307/23 |
| 6,181,028 B1 * | 1/2001 | Kern et al. | 307/64 |
| 6,563,233 B1 * | 5/2003 | Hinks | 307/64 |
| 6,621,689 B1 * | 9/2003 | Flegel | 361/631 |
| 6,657,416 B2 * | 12/2003 | Kern et al. | 322/29 |
| 6,686,547 B2 * | 2/2004 | Kern et al. | 200/268 |
| 7,005,590 B1 * | 2/2006 | Willis | 200/50.32 |
| 7,119,457 B1 * | 10/2006 | Flegel | 307/64 |
| 7,142,950 B2 * | 11/2006 | Rasmussen et al. | 700/286 |
| 7,208,850 B2 * | 4/2007 | Turner | 307/64 |
| 7,239,045 B2 * | 7/2007 | Lathrop et al. | 307/80 |
| 7,402,766 B1 * | 7/2008 | Jonas et al. | 200/50.33 |
| 7,418,314 B2 * | 8/2008 | Rasmussen et al. | 700/286 |
| 7,446,437 B2 * | 11/2008 | Paik et al. | 307/115 |
| 7,514,815 B2 * | 4/2009 | Paik et al. | 307/64 |
| 7,531,762 B2 * | 5/2009 | Flegel | 200/50.32 |
| 7,551,425 B2 * | 6/2009 | Byrne | 361/622 |
| 7,599,171 B1 * | 10/2009 | Remmert | 361/631 |
| 7,602,083 B1 * | 10/2009 | Flegel et al. | 307/126 |
| 7,615,888 B2 * | 11/2009 | Lathrop et al. | 307/64 |
| 7,616,432 B2 * | 11/2009 | Luebke et al. | 361/631 |
| 7,692,332 B2 * | 4/2010 | Nordman et al. | 307/64 |
| 2009/0216386 A1 * | 8/2009 | Wedel | 700/295 |

* cited by examiner

FIG. 1 "Prior Art"
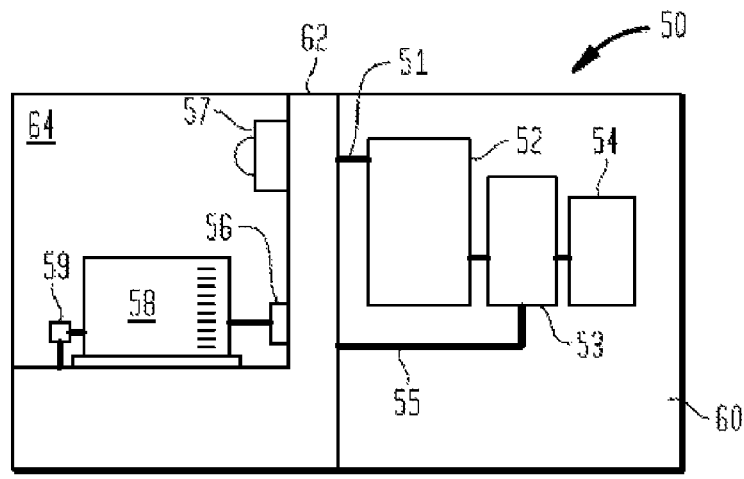
FIG. 2
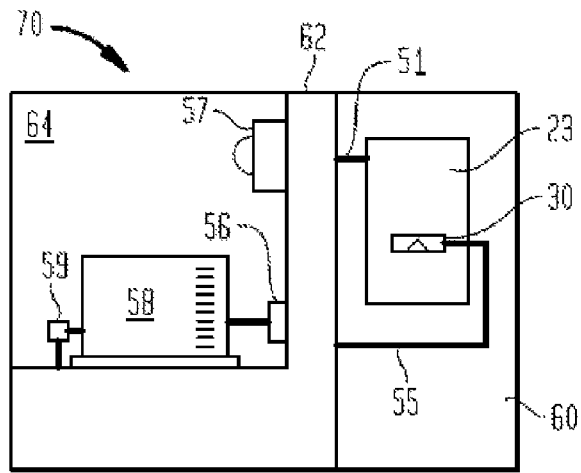
FIG. 3 "Prior Art"
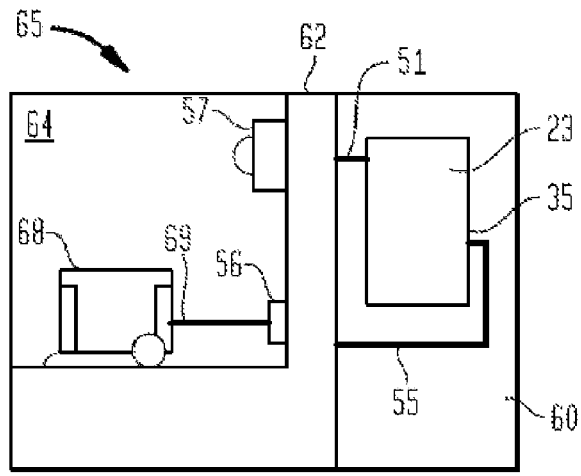

GENERATOR READY LOAD CENTER

CROSS-REFERENCE TO RELATED APPLICATION

This patent application claims priority to and the benefit of pending U.S. Provisional Patent Application Ser. No. 61/039,498 filed on Mar. 26, 2008, titled "Generator Ready Load Center," the entire disclosure of which provisional application is incorporated herein by reference.

FIELD OF THE INVENTION

The present invention relates generally to a load center or meter load center combinations. More particularly, the invention encompasses a generator ready load center (GRLC). The present invention is also directed to a novel generator ready load center that operates as a standard load center but is ready to accommodate an automatic transfer switch (ATS) for a standby generator, or a manual transfer switch (MTS) for a portable generator.

BACKGROUND INFORMATION

There are many situations where it is desired to have an auxiliary power source which can be switched to and from the load, such as, for example, in the event of a commercial power failure or due to excessive power variations. There are many reasons to provide this auxiliary power source. Other situations where backup or standby power supplies are consider important include: automatic banking services, automatic industrial processes, communication and signaling centers for maritime and aerial transportation, radio and television stations, various emergency and security services, and many other residential applications, to name a few.

Commercial power alone is generally not considered sufficiently reliable as a sole source of power for such usages. Interruptions commonly occur and loads may vary as other users come on and off the commercial power line. These problems are further compounded due to external factors, such as, weather, accidental damage to a component within the power grid, to name a few.

Standby power systems are generally known within the prior art. Such standby power supplies usually comprise a generator, and the generator is typically in a standby mode. Once it is established that the prime power source, typically, from the commercial power grid has ceased to provide the needed power, sensors within the system initiate the powering-on of the standby generator, an ATS (automatic transfer switch) then transfers the load from utility power to the standby generator, which provides the needed power to the critical or essential components and thus a continuous supply of current from the standby generator is provided to the components wired to the back-up load center. When the utility power is restored, the ATS automatically disconnects the standby generator and automatically reconnects the utility power.

It has been observed that the majority of the standby generator installations are performed after a home has already been constructed. One main reason is that often a major extended power outage in the home owner's area triggers a generator purchase. In most all situations the house has been wired and a whole house load center already exists at the time of the generator installation. However, at the time of the generator installation one has to install an ATS, back-up circuits which are physically moved to a new back-up load center, power leads are installed that run to the standby generator, fuel lines, such as gas lines, have to run to the generator site, and then, of course, a generator has to be installed. A typical automatic standby generator uses fuel media, wherein the fuel media is gasoline, natural gas, propane gas, or diesel, to name a few. In such applications often the load center and gas supply are not conveniently positioned close to the generator location, requiring extensive electrical work (often behind walls) and lengthy gas line runs. Installation costs can be substantial for most typical retrofit installations, and this cost does not include the generator or the transfer switch cost.

Therefore there is a need for improvement in a load center and in particular for a load center that is generator ready.

This invention improves on the deficiencies of the prior art and provides an inventive generator ready load center (GRLC).

PURPOSES AND SUMMARY OF THE INVENTION

The invention is a novel generator ready load center that provides an automatic and manual transfer between primary and secondary power sources. In accordance with the invention the generator ready load center solves the problem of dangerous back-feeding between the primary power source and the secondary power source.

Therefore, one purpose of this invention is to provide a generator ready load center (GRLC) to transfer power between primary and secondary or backup power sources without dangerous back-feeding.

Another purpose of this invention is to provide a generator ready load center that operates as a standard load center but is ready to accommodate an ATS (automatic transfer switch) for a standby generator.

Still another purpose of this invention is to provide a generator ready load center that operates as a standard load center but is ready to accommodate a MTS (manual transfer switch) for a portable generator.

Yet another purpose of this invention is to provide a generator ready load center that has two separate and distinct sections, a first section for non-essential circuits, and a second section for essential (emergency) circuits.

Yet another purpose of this invention is to provide a robust designed generator ready load center for home, commercial and industrial use.

Therefore, in one aspect this invention provides a generator ready load center that includes an enclosure having at least one base pan. A first set of bus bars is secured to a first area of the base pan, and a second set of bus bars secured to a second area of the base pan. At least one non-essential circuit is secured to the first set of bus bars and at least one essential circuit secured to the second bus bars. The first set of bus bars and the second set of bus bars are powered from a utility power source. Upon failure of power from the utility power source the generator ready load center has at least one means for switching to a standby power source such as a generator without dangerous back-feeding.

In another aspect this invention comprises a load center for optionally installing capability for switching between a plurality of power sources. The load center has an enclosure having at least one base pan portion having means for mounting a plurality of sets of bus bars. The plurality of sets of bus bars are organized into groups of sets of bus bars and the base pan is subdivided into a plurality of areas into which one group of the groups of the sets of bus bars are secured to each area of the plurality of areas of the base pan. Each set of bus bars of a first portion of the groups of sets of bus bars have at least one primary circuit secured to the set of bus bars and each set of bus bars of a second portion of the groups of sets of bus bars have at least one secondary circuit secured to the set of bus bars. Each of groups of sets of bus bars receives power from one of the plurality of primary power sources. The load center further includes at least one means for switching from one of the plurality of power sources to another of the plurality of power sources to deliver power to at least one of the sets of bus bars without dangerous back-feeding.

BRIEF DESCRIPTION OF THE DRAWINGS

Although the scope of the present invention is much broader than any particular embodiment, a detailed description of embodiments follows together with drawings. These drawings are for illustration purposes only and are not drawn to scale. Like numbers represent like features and components in the drawings. The invention may best be understood by reference to the ensuing detailed description in conjunction with the drawings in which:

FIG. 1 illustrates one method of installing a standby generator.

FIG. 2 illustrates a typical installation of a standby generator using the inventive generator ready load center (GRLC).

FIG. 3 illustrates a typical installation of a portable generator using the inventive generator ready load center (GRLC).

DETAILED DESCRIPTION

Figure 4:
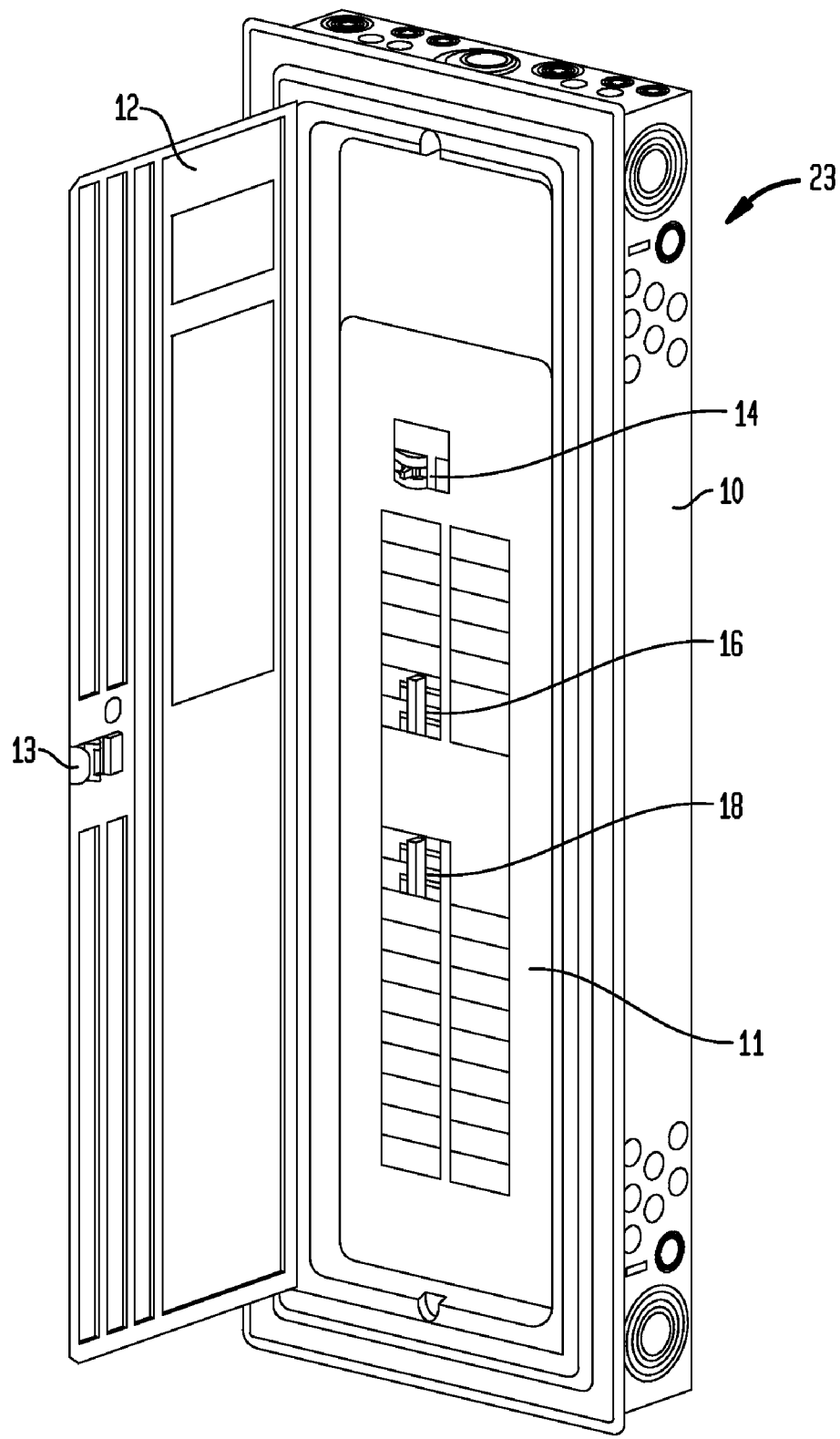
FIG. 4 illustrates a first embodiment of a generator ready load center (GRLC) of this invention.

The inventive generator ready load center is a dual purpose apparatus. First its design allows it to be used as a standard load center, such as, by utilizing both the upper and lower interiors without any modifications. Secondly, its design allows for it to be "ready" from the factory to have an automatic transfer switch (ATS) installed and to convert it into a standby generator circuit protection system. And, one would install a manual transfer switch (MTS) to convert it into a portable generator circuit protection system.

The GRLC (generator ready load center) unit can be made using several designs. The GRLC is a main breaker load center or a lug load center that is placed either on the interior of an enclosure or building or on the exterior of the enclosure or building. Further, the form of the GRLC is in the form of a standardized load center, a meter-load center combination, or a panel board. The GRLC may have a variety of circuit combinations.

FIG. 1 illustrates one method 50 of installing a standby generator 58. In a typical set-up a load center 52 is installed in a room or area 60 where power leads 51 and a utility meter 57 are electrically connected to the load center 52. The room or area 60 is typically selected from a group comprising a utility room, a garage, a basement, a hallway, a closet, to name a few. Typically, a wall 62 separates the room or area 60 from the external environment 64 such as, outdoor 64. For the purposes of illustration the optional junction box 56 and the utility meter 57 are shown in the external environment 64 however, they can as easily be installed in the room or area 60 or some other location. There are usually two reasons to install a standby generator or a portable generator. The first and most common reason is that often after a major extended power outages in the area, the purchases of a standby generator is triggered. The second is either due to code compliance or as a back-up power source. In each case a new back-up load center 54 is installed where the back-up or essential circuits are physically moved from the load center 52 and installed into the new back-up load center 54. An automatic transfer switch (ATS) 53 or a manual transfer switch (MTS) 53 is then installed between the non-essential load center 52 and the essential or back-up load center 54 and the power leads 55 are connected to the automatic transfer switch 53. Power leads 55 then run to an optional junction box 56 which is connected to the standby generator 58. Typically, a fuel source line 59 such as, a gas line 59 runs the generator 58. It is preferred that that fuel source line 59 carries fuel such as gasoline, natural gas, propane gas, or diesel, to name a few. For such applications often the load center 52 and the gas supply 59 are not conveniently positioned close to the generator location, requiring extensive electrical work (often behind walls) and lengthy gas line runs. Installation charges can be rather substantial for most typical retrofit installations and these costs do not include the cost of the generator 58 or the cost of the automatic transfer switch 53.

FIG. 2 illustrates a typical installation 70 of a standby generator 58 using the inventive generator ready load center (GRLC) 23. The GRLC 23 can be installed initially in place of the load center 52 or the GRLC 23 could be installed as a replacement for the load center 52 automatic transfer switch 53 and the back-up load center 54. The power leads 55 now run from the generator ready load center) 23 to the junction box 56. After the GRLC 23 has been installed and there is a subsequent requirement to install a stand-by generator 58 all one has to do now is to install an automatic transfer mechanism 30 or an ATS (automatic transfer switch) 30 into the GRLC 23 and then install the generator 58. The gas lines 59 or fuel lines 59 again run to the standby generator 58.

FIG. 3 illustrates a typical installation 65 of a portable generator 68 using the inventive generator ready load center (GRLC) 23. Prior to the installation of the portable generator 68 the room or area 60 already has the GRLC 23 installed. When the portable generator 68 needs to be installed, one connects the power cord 69 from the portable generator 68 to the inlet box 56. A mechanical interlock 35 or a manual transfer switch (MTS) 35 is then installed inside the GRLC 23 and the portable generator 68 is ready to provide service.

As one can see that the initial installation of the GRLC 23 illustrated in FIG. 2 and FIG. 3, gives the owner the option to install the standby generator 58 or the portable generator 68 either during the initial installation of the GRLC 23 or whenever one desires to install the stand-by generator 58 or the portable generator 68.

With this invention the cost of the GRLC 23 is on the same order of magnitude as a regular 40 circuit load center 52. Additionally, the automatic transfer mechanism installed inside the GRLC 23 is significantly less expensive than a typical automatic transfer switch (ATS) 53. Furthermore, as one can see that the final installation uses fewer components, making better use of real estate, and also providing for a much cleaner looking installation.

FIG. 4 illustrates a first embodiment of a generator ready load center (GRLC) 23 of this invention. The GRLC 23 comprises a standard housing or enclosure 10 having a cover 11. The GRLC 23 has a main circuit breaker (14) that can disconnect power to the entire load center. The main circuit breaker (14) can be replaced by main lugs. The main (utility) power source lands on the main breaker (14). The upper circuit breaker (16) funnels the power from the upper interior to the lower circuit breaker (18), which in turns powers the lower interior. Non-essential circuits are wired in the upper interior and are only powered by the utility power. Critical circuits are wired in the lower interior and are powered by the utility and standby power sources.

Figure 5:
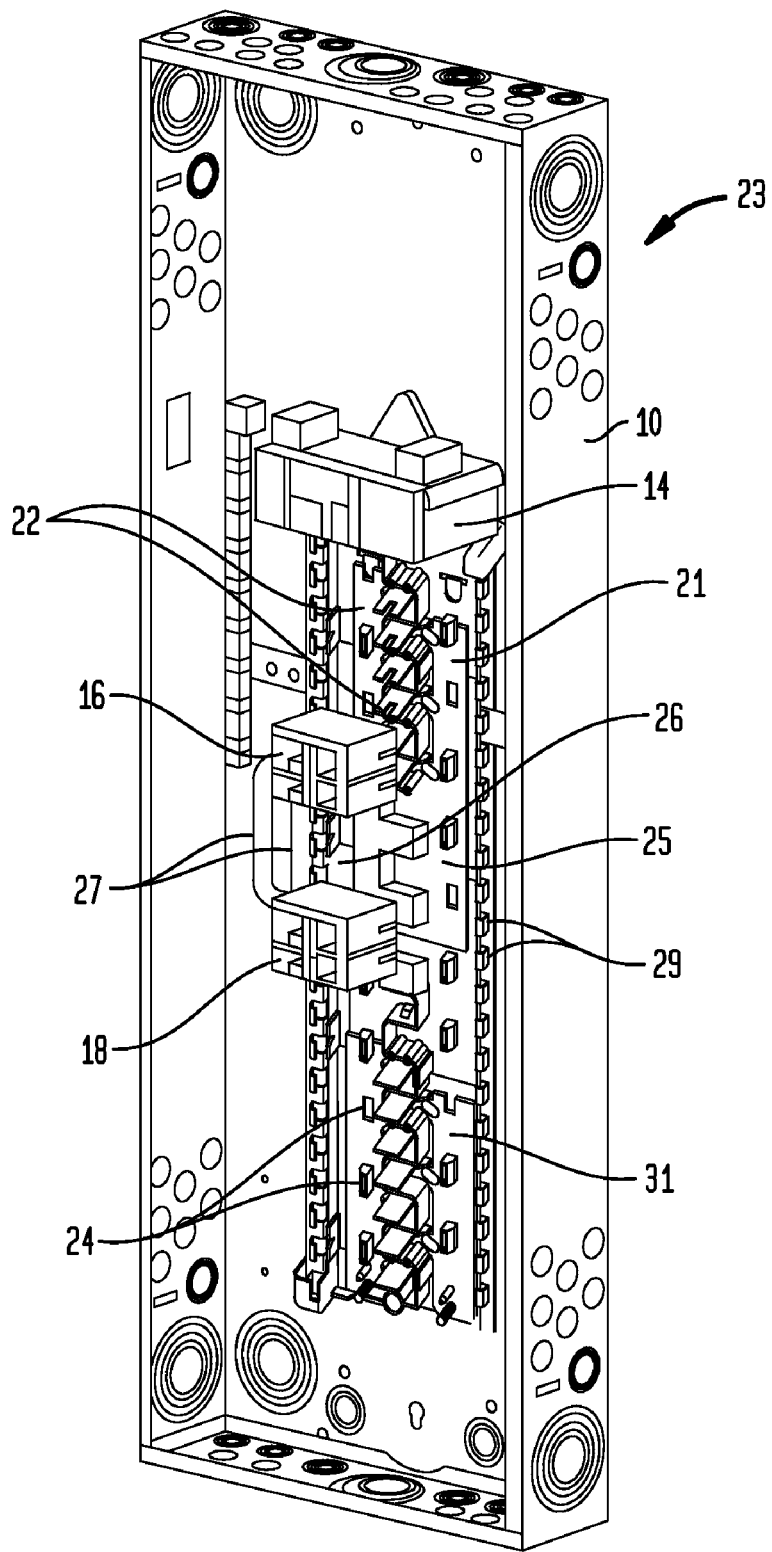
FIG. 5 illustrates a detailed inside view of a generator ready load center (GRLC) of FIG. 4.

FIG. 5 illustrates a detailed inside view of a generator ready load center (GRLC) 23 of FIG. 4 with the cover 11 removed. The generator ready load center (GRLC) 23 has at least one base pan 25. The base pan 25 has a first or non-essential circuit section 21 and a second or essential (emergency) circuit section 31. The first circuit section 21 has a first or upper interior set of bus bars 22. The second circuit section has a second or lower interior set of bus bars 24. Electrical connections 27 connect the upper circuit breaker 16 to the lower circuit breaker 18 to thus connect the upper set of bus bars 22 to the lower set of bus bars 24. The electrical connection 27 can be a jumper wire, bus bars or any other sufficiently conductive material. The base pan 25 also has a mounting area 26 for an ATS (automatic transfer switch) 30 (shown in FIG. 6), and a location 29 for the installation of the non-automatic generator switch 34 (shown in FIG. 6). As shown in FIG. 5, the GRLC 23 interior is designed with two bus structures, namely, the first or upper interior bus structure 21 that contains the first or upper bus bars 22 and the second or lower interior bus structure 31 that contains the second or lower bus bars 24. The upper interior bus section 21 is connected to the utility power source. As stated earlier, the circuits in the upper portion 21 are considered non-essential circuits, and are referred to as the non-essential circuit section 21, which under an emergency situation, such as, utility power failure, would not be required for normal operations. The lower interior section 31 contains all circuits considered essential under emergency conditions that are referred to as the essential (emergency) circuit section 31 by the user or owner. The lower interior bus bars 24 are sub-fed from a 2-pole breaker 18 or lug block. The 2-pole breaker 18 is powered by the upper interior bus bars 22 and a 2-pole non-automatic switch or circuit breaker 16. This connection allows continuous use of utility power in both interiors 21 31 under normal operating conditions, and powered by the generator only in the second section 31. It should be appreciated that the first circuit breaker 16 feeds utility power to the second circuit breaker 18 powering the second section 31 with power from the first section 21.

Figure 6:
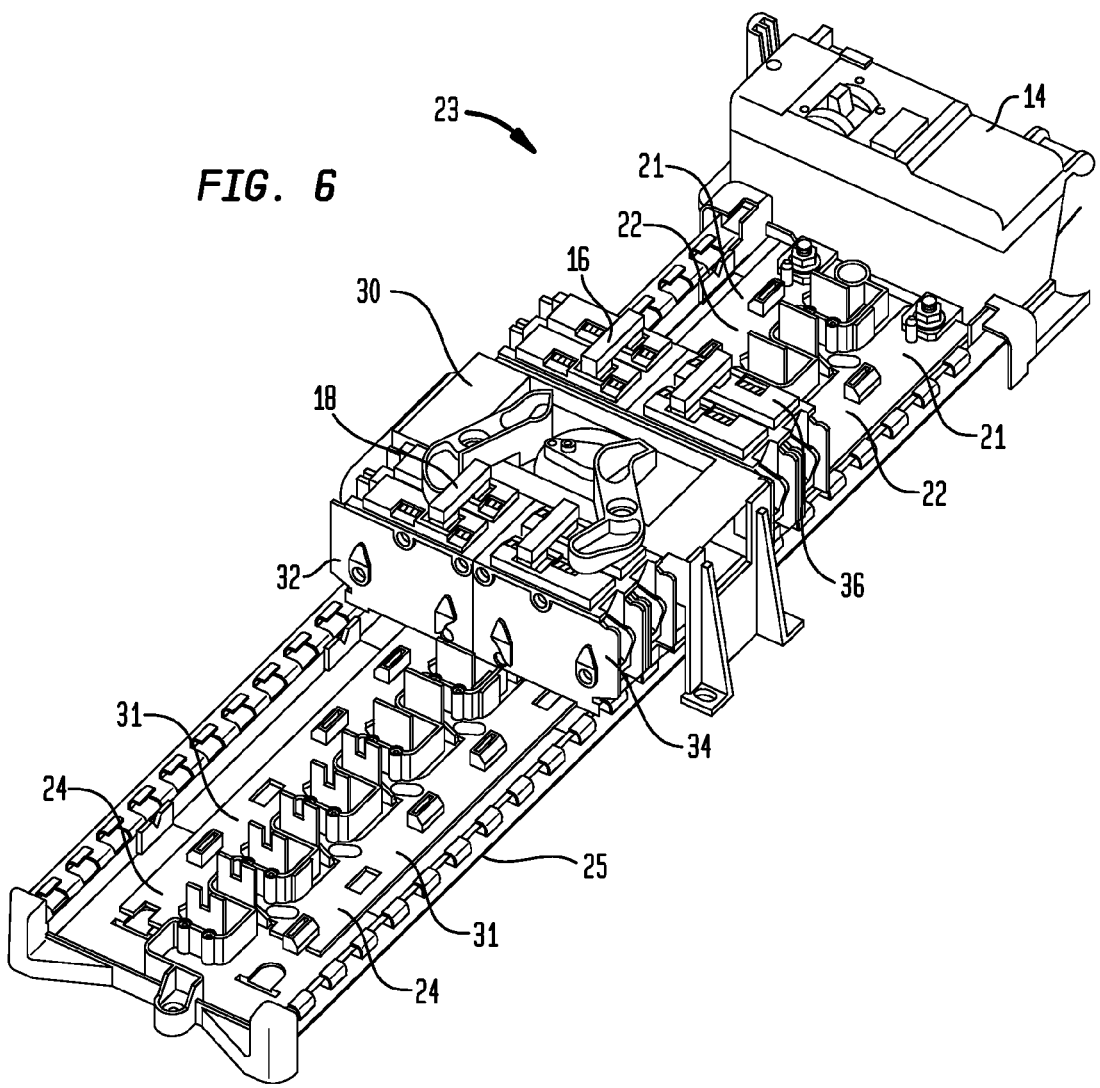
FIG. 6 is a detailed perspective view showing several of the interior components of the generator ready load center (GRLC) of FIG. 4.

FIG. 6 is a detailed perspective view showing several of the interior components of the generator ready load center (GRLC) 23 of FIG. 4. FIG. 6, shows that with the installation of the standby generator 58 an automatic transfer switch (ATS) 30 would be installed in the GRLC 23. The ATS 30 has another 2-pole non-automatic switch or circuit breaker 34 which is installed to allow power connection from the onsite standby generator 58 without dangerous back-feeding. With this arrangement of the ATS 30 added non-automatic switch or circuit breaker 34 installed in the lower interior section 31 and voltage sensing breaker 36 installed in the upper section 21 for the generator 58 can now be mechanically switched back and forth between the utility power source and the standby generator power source by turning the two non-automatic switches or circuit breakers for the second section 31 to their respective on/off positions. In a utility power outage condition only the lower interior section 31 will be energized since the GRLC 23 design allows the ATS 30 to isolate the upper interior section 21 from being energized simultaneously. The non-automatic standby generator switch 34 is powered by the standby generator 58 of FIGS. 2 and 68 of FIG. 3.

Figure 7:
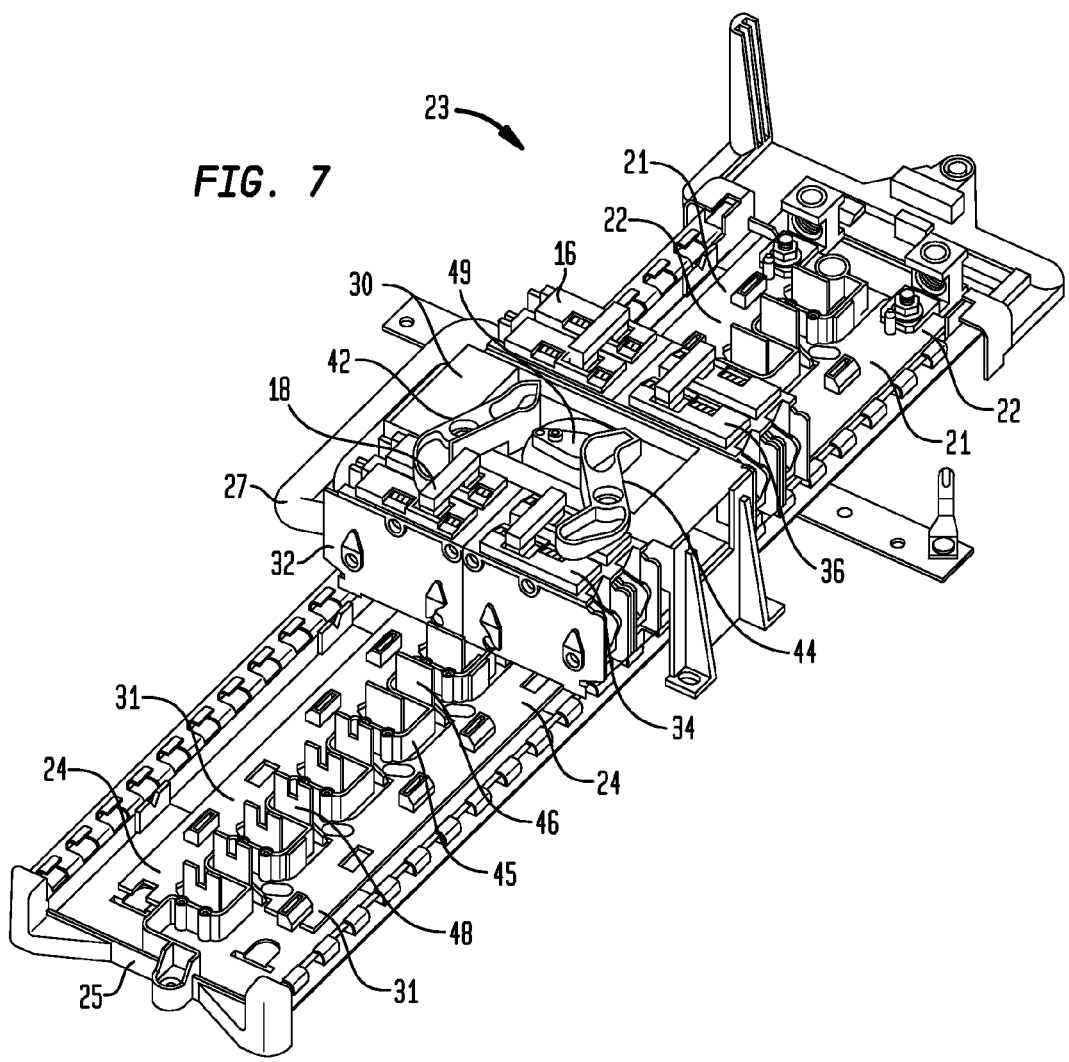
FIG. 7 is a detailed perspective view showing the main lug interior of the generator ready load center (GRLC) of FIG. 4.

FIG. 7 is a detailed perspective view showing the main lug interior of the generator ready load center (GRLC) 23 of FIG. 4. The automatic transfer switch (ATS) 30 has a first arm 42 and a second arm 44. Motions of the arms 42 and 44 is triggered by the presence or absence of the utility power. The arms 42 and 44 deactivate the connection to the utility power and activate the generator in sequence to prevent dangerous back-feeding.

Figure 8:
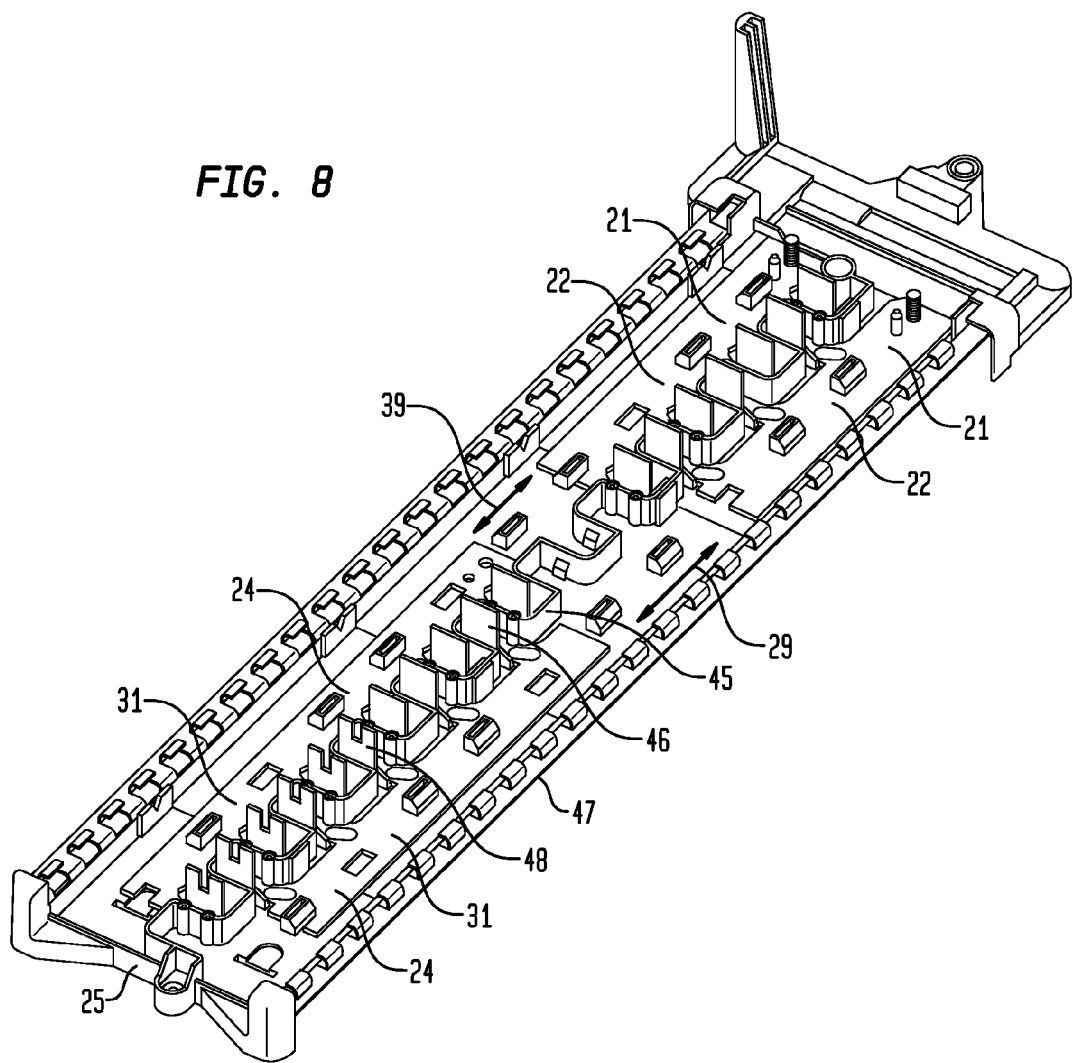
FIG. 8 is a detailed perspective view of the interior of the generator ready load center (GRLC) of FIG. 4, showing a split-bus arrangement.

FIG. 8 is a detailed perspective view of the interior of the generator ready load center (GRLC) 23 of FIG. 4, showing a split-bus arrangement. As one can see that area 29 and area 39 distinctly separates the first or non-essential circuit section 21 having the first or upper interior bus bars 22 from the second or essential (emergency) circuit section 31 having the second or lower interior bus bars 24 and that there is no electrical connection between the first section 21 and the second section 31 at the base level.

Figure 9:
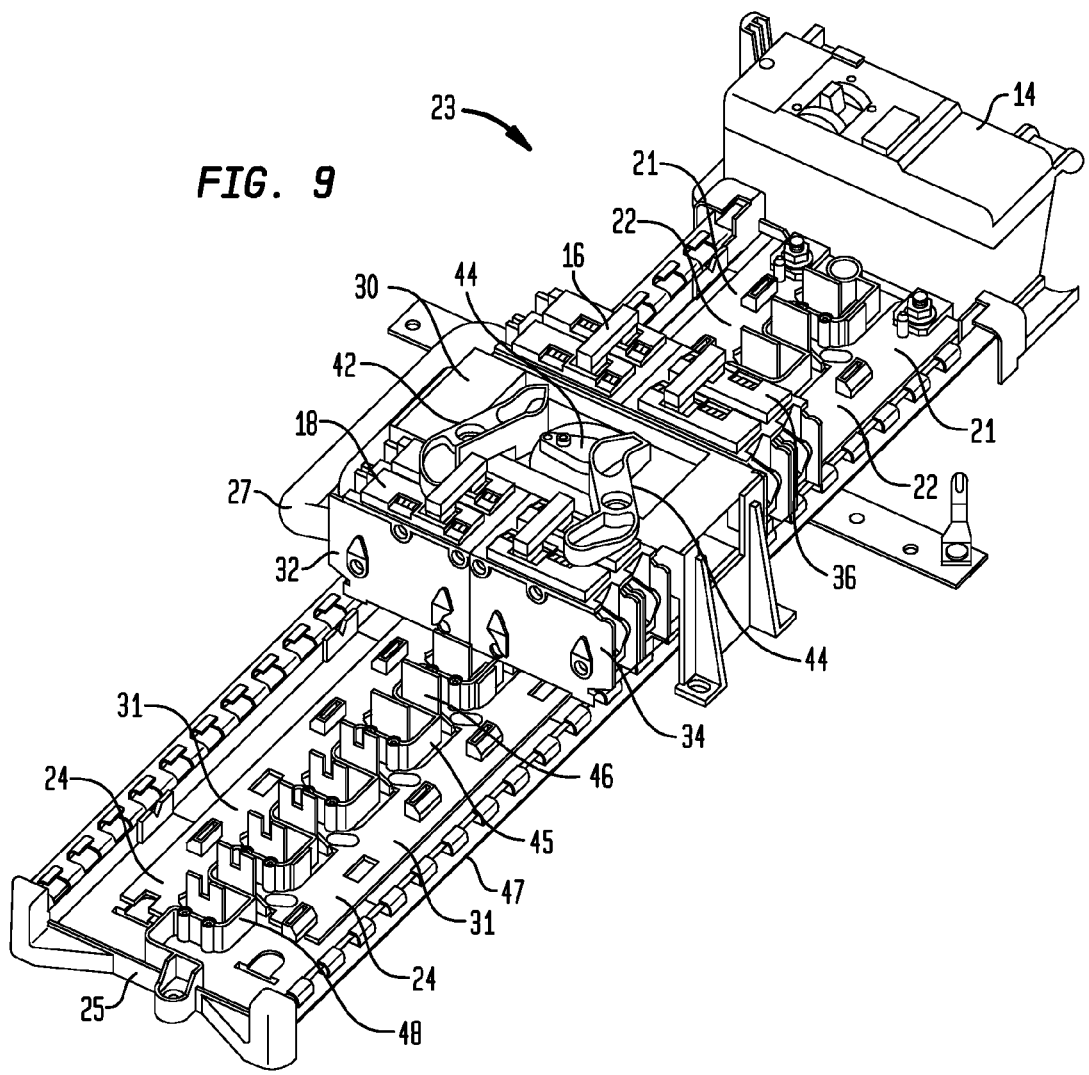
FIG. 9 is another detailed perspective view of the generator ready load center (GRLC) of FIG. 4.

FIG. 9 is another detailed perspective view of the generator ready load center (GRLC) 23 of FIG. 4. During power transfer from the primary or utility power to the secondary backup or generator power, a switching means 49, such as, a rotary dial 49, a sliding switch 49, to name a few, pushes the second arm 44 causing the second circuit breaker 18 to turn OFF, and turning the generator non-automatic switch 34 to the ON position switching between the utility power and the generator power without dangerous back-feeding. When the utility power is restored the switching means 49 then pushes the first arm 42 causing the generator non-automatic switch 34 to turn OFF, and turns the second circuit breaker 18 to the ON position.

With this invention, a user is provided a means for installing an automatic transfer switch (ATS) 30 that will control the switching from utility supplied electrical power to that supplied by an onsite standby generator 58 in the event of a power outage and then back to the utility source after utility power is restored without dangerous back-feeding. The generator ready load center (GRLC) 23 is designed to be installed with the intent of being utilized as a standard load center with the provisions of giving the owner the option of converting it to a unit that can have critical circuits fed by a standby generator with the simple installation of an ATS 30 and associated field wiring. The GRLC 23 design facilitates the avoidance of having to completely rework previously existing wiring.

With the inventive generator ready load center (GRLC) 23, one can save substantial amounts of money in future generator installation expenses while keeping initial expenses to a minimum. As shown in FIG. 2 and FIG. 3, the generator ready load center (GRLC) 23 can be used with an automatic standby generator 58 or a portable generator 68 respectively.

The installation of the transfer mechanism can be performed at the time of the generator installation. The automatic transfer switch (ATS) operates automatically when connected to the generator and transfers the load from the utility to the generator and then back to the utility.

Instead of having one interior like standard load centers 52 the inventive GRLC 23 has two interiors. During normal operating utility conditions, both interiors are powered. However, during generator back up conditions, only the essential or lower interior containing critical circuits is powered. Since standby generators are hard wired into the location's electrical system, and then plumbed into the fuel source 59 such as, natural gas 59 or a propane supply 59 installing them after the location construction is complete can be costly and time consuming. During construction, a GRLC 23 can be installed eliminating the need for future rewiring. Pre-planning on the installer's part also includes running a gas line to the future generator site, and installing a junction box. GRLC 23 All circuit spaces are powered by utility power. Selected circuits are also backed up by the generator 58 or portable generator 68.

While the present invention has been particularly described in conjunction with a specific embodiment, it is evident that many alternatives, modifications and variations will be apparent to those skilled in the art in light of the foregoing description. The embodiments as described provide a switching between a utility power source and an auxiliary generator. It will be apparent to those skilled in the art that the auxiliary power sources may be batteries, fuel cells or other ways of generating auxiliary backup power. It will further that it is in keeping with intent of the present invention that the primary power is not the utility power source but a wind generator or solar cells that fail to generate (no wind or low light levels) or other types of generating systems. The secondary power may in fact be the utility power source. Even further, the load center may have more than the two essential and nonessential areas having sets of bus bars and being capable of handling multiple power sources such that the primary power source for an area of the of the load center is switched to a secondary power source and even to other power sources. The automatic transfer switch and the manual transfer switch are in this embodiment able to transfer the bus bars within a given area to any one of multiple power sources without dangerous back-feeding.

It is therefore contemplated that the appended claims will embrace any such alternatives, modifications and variations as falling within the true scope and spirit of the present invention.

What is claimed is:

1. A generator ready load center, comprising:
   an enclosure having at least one base pan,
   a first interior bus structure containing a first set of bus bars secured to a first area of said base pan and connected to a utility power source,
   a second interior bus structure containing a second set of bus bars secured to a second area of said base pan,
   a first non-automatic switch coupled to the first interior bus structure,
   a subfeed circuit breaker coupled to the second interior bus structure,
   an electrical connection connecting the first non-automatic switch and the subfeed circuit breaker,
   a second non-automatic switch coupled to the second interior bus structure,
   a transfer switch connected to the subfeed circuit breaker and the second non-automatic switch, and
   at least one non-essential circuit secured to said first set of bus bars and at least one essential circuit secured to said second bus bars, and wherein said first set of bus bars and said second set of bus bars are under normal operating conditions powered from the utility power source and in a utility power outage condition only the second interior bus structure is energized.

2. The generator ready load center of claim 1 wherein the transfer switch is an automatic transfer switch installed between said first set of bus bars and said second set of bus bars.

3. The generator ready load center of claim 1 wherein the means for switching is a manual transfer switch installed between said first set of bus bars and said second set of bus bars.

4. The generator ready load center of claim 1, wherein said second set of bus bars is powered from a generator.

5. The generator ready load center of claim 1, wherein said first set of bus bars is electrically isolated from said second bus bar.

6. The generator ready load center of claim 1, wherein said electrical connection is selected from a group consisting of a jumper wire, a bus, and a conductive bar.

7. The generator ready load center of claim 1, wherein at least one automatic transfer switch is installed between said first set of bus bars and said second set of bus bars, and wherein said at least one automatic transfer switch has at least one switching means to transfer power from a first power source to a second power source without dangerous back-feeding.

8. A load center for optionally providing capability for switching between a plurality of power sources, comprising:
   an enclosure having at least one base pan portion having a plurality of sets of bus bars including upper interior set of bus bars and lower interior set of bus bars mounted thereon;
   an upper non-automatic switch coupled to the upper interior set of bus bars;
   a lower circuit breaker coupled to the lower interior set of bus bars;
   an electrical connection electrically connecting the upper non-automatic switch and the lower circuit breaker; and
   a mounting area on the base pan between the upper non-automatic switch and the lower circuit breaker adapted to mount a transfer switch.

9. The load center of claim 8, wherein one of said plurality of power sources is a generator that is switched by switching from said one of the plurality of power sources to said generator without dangerous back-feeding.

10. The load center of claim 8, wherein the lower interior set of bus bars and the upper interior set of bus bars are electrically isolated from each other.

11. The load center of claim 10, further comprising electrical the electrical connection is a jumper wire, a bus, or other conductive material.

12. A generator ready load center, comprising:
   an enclosure having a base pan;
   a first interior bus structure containing a first set of bus bars secured to a first area of the base pan and connectable to a utility power source;
   a second interior bus structure containing a second set of bus bars secured to a second area of the base pan;
   a first non-automatic switch coupled to the first interior bus structure;
   a subfeed circuit breaker coupled to the second interior bus structure;
   an electrical connection connecting the first non-automatic switch and the subfeed circuit breaker;
   a second non-automatic switch coupled to the second interior bus structure;
   a voltage sensing breaker coupled to the first interior bus structure; and
   an automatic transfer switch including a first arm and second arm operable to switch the subfeed circuit breaker and the second non-automatic switch, respectively.

* * * * *